Figure 1:
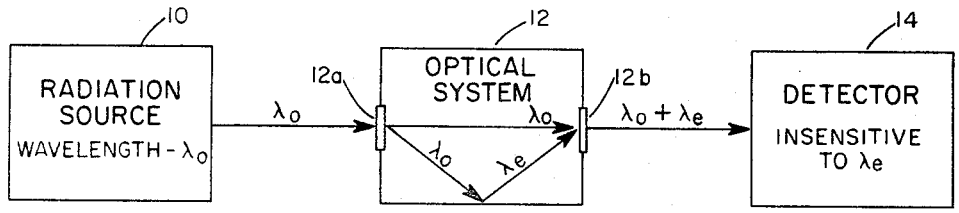

July 30, 1968    J. C. SCANLON ETAL    3,395,285
METHOD AND MEANS FOR PREVENTING REFLECTION OF RADIATION
Filed April 2, 1964

FREDERICK Y. MASSON
JOSEPH C. SCANLON
INVENTORS

BY *S. A. Giarratana*
*Francis L. Masselle*
ATTORNEYS

3,395,285
METHOD AND MEANS FOR PREVENTING REFLECTION OF RADIATION
Joseph C. Scanlon, Elizabeth, and Frederick Y. Masson, West Orange, N.J., assignors to General Precision Inc., Little Falls, N.J., a corporation of Delaware
Filed Apr. 2, 1964, Ser. No. 356,784
4 Claims. (Cl. 250—219)

This invention relates to optical systems in general and, particularly, to methods and means for eliminating unwanted reflections in such systems. As will become more fully apparent as this description proceeds, the invention is limited in its applicability to optical systems which include a radiation sensitive detection means which responds to radiation of a particular range of wavelengths. Accordingly, by way of example, but not limitation the invention will be described herein as applied to a particular apparatus embodying such an optical system, viz., a "pinhole detector," the common term of reference for devices which automatically inspect very thin sheets of metal, such as tin plate, or like material, for minute perforations.

It is almost universal practice in optical systems of any sort to minimize unwanted reflections by utilizing flat black finishes on all non-optical surfaces. While these finishes may be achieved by anodization, painting, or other suitable techniques, the object is the same: to absorb incident radiation. In situations where it is necessary to exclude spurious radiation from an optical system, baffles and diaphragms are utilized, and these too are fabricated with flat black surface finishes to prevent reflection.

Unfortunately, flat black surfaces are not 100% efficient in the absorption of incident radiation albeit in most cases, as in cameras, binoculars, and the like, the amount of reflection from a flat black surface may be tolerable.

In certain types of apparatus, however, including the pinhole detector alluded to above, highly-sensitive sensing means are necessarily employed to detect extremely low levels of illumination; in such equipment the small amount of radiation reflected from flat black surfaces is enough to seriously impair the operation of the system. Specifically, it requires that the sensitivity of the detection means be reduced to the point where it no longer responds significantly to the reflected radiation, thus putting a lower limit on the magnitude of the illumination sought to be measured or detected.

In some types of optical apparatus, "collimated" light is utilized and this, in theory, should enable the use of diaphragms, baffles, and the like, and render them effective as means for excluding spurious rays. However, ideal collimation is never achieved in practice and the skew rays inevitably present and reflected from the conventional (flat black) anti-reflection surfaces, are sensed by the detection means.

In pinhole detectors a unique problem exists: for reasons which will become apparent when the apparatus is described in detail, optical pinhole detectors utilize servo-motor operated sliding baffles or "shutters" which closely, but without contact, follow the edges of the sheet material being inspected as it runs through the apparatus. The servo-motor system is under the control of photocells which sense the edge of the sheet material and adjust the shutters accordingly. The photocells are necessarily extremely sensitive and, as precise positioning of the shutters is essential to satisfactory operation of the apparatus, even relatively low levels of reflected illumination are intolerable.

With the foregoing state of the art in view, it is the fundamental object of the present invention to provide means and methods for the improvement of optical systems by the effective elimination of unwanted reflected radiation.

Another object is the provision of novel anti-reflection surfaces and components for optical systems.

A more specific object is to provide, in an optical system having detection means responsive to radiation in a particular range of wavelengths, anti-reflective surfaces which eliminate undesired reflected radiation.

A further object is the provision of improved optical pinhole detectors.

To the fulfillment of these and other objects, the invention contemplates a method of eliminating reflected radiation of a particular range of wavelengths which comprises the step of fabricating at least the surface region of the body reflecting such radiation with a radiation frequency converting material which responds to radiation incident upon such region with emission of a characteristic wavelength outside of said range of wavelengths.

In accordance with another of its aspects, the invention contemplates an optical system including a source of radiation of a particular range of wavelengths, detection means responsive to radiation in that range, and anti-reflecting surfaces in this system formed of material which responds to the radiation with the emission of radiation of wavelengths outside the range of response of the detection means.

Figure 2:
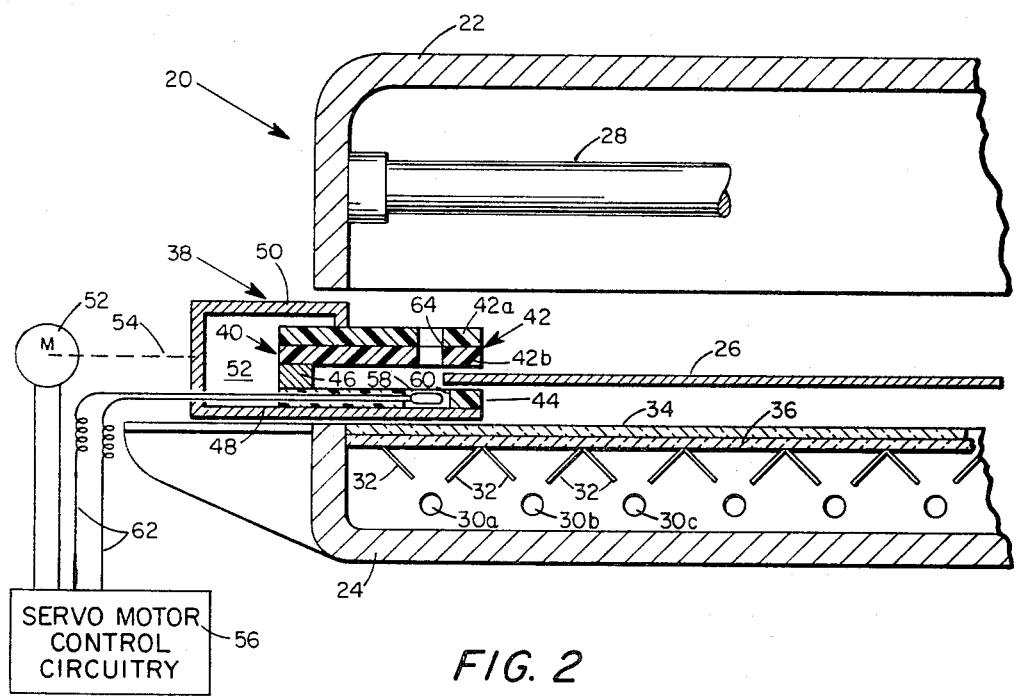

Additional objects of the invention, its advantages, scope, and the manner in which it may be practiced will be more fully apparent to persons conversant with the art from the following description of an exemplary embodiment thereof taken in conjunction with the subjoined claims and annexed drawings in which:

FIGURE 1 is a diagrammatic representation of an optical system which will be utilized and referred to in describing the general principles of the invention, and FIGURE 2 is a fragmentary sectional view, partially schematic, showing a pinhole detector embodying the present invention.

As previously mentioned, the present invention is limited in its specific applications to optical systems which include a radiation-detecting means sensitive to a particular finite range of wavelengths. The detector might be a photo-multiplier tube, a solid state photovoltaic cell, a photographic emulsion, or any other element or device which reacts to photo-effective illumination so as to generate a perceptible effect. As symbolically shown in FIGURE 1, in the most usual case such an apparatus would include a source 10 of radiation of a particular wavelength region which is sent through an optical system 12 and received by the detection means 14. If desired, the optical system may include means for collimating the light transmitted thereby. Detector 14 of course, is one which responds to radiation within the range of wavelengths emitted by the radiation source. Although not shown in FIGURE 1, the optical system may comprise various non-optical elements or structure such as a housing, supports and mountings for lens, prisms, filters or other optical elements, as well as diaphragms, shutters, baffles, etc.

In accordance with the present invention all, or any part, of the non-optical elements or structure which would reflect unwanted radiation to the detection means have at least their surface regions fabricated of a particular radiation absorbent material.

For ease of reference these materials will be referred to as radiation frequency converters for lack of better terminology to encompass generically the two basic categories of materials involved, viz., (1) ordinary luminescent materials and (2) materials which are not luminescent in the strict sense of the word because they emit little or no visible radiation but nevertheless have the ability to absorb radiation over a particular range of wavelengths.

Factors controlling on the selection of particular materials will become apparent as the present description proceeds. In any event, the non-optical structure involved is fabricated entirely of the selected material or the material is applied in the form of a paint, surface coating, or laminate.

At this juncture it would be well to establish precisely the nature of the frequency converter material in regard to its suitability for use in conjunction with the present invention. Considering the true phosphors, broadly defined, a luminescent material such as fluorosin which is one which emits light in response to any stimulus other than high temperature. (Thus, for example, steel is not a luminescent material although it emits light (even at room temperature) due to thermal vibrations.)

Among the more important of the various specific types of luminescent materials which may be utilized in the practice of the present invention are the following: (1) photoluminescent materials, which emit light as a result of non-luminous incident radiations; (2) fluorescent materials, which continue to emit radiation only so long as the stimulus is applied; and (3) phosphorescent materials wherein the emission persists after the excitation is removed.

The critical characteristic of luminescent materials suitable for use in the present invention is that the wavelengths of the emitted radiation fall outside the range to which the detection means responds. It is axiomatic, of course, that in an optical system which includes a correlated source of radiation and a detection means responsive to radiation from said source, that the luminescent material must also be susceptible of stimulation by the source radiation. When luminescence is excited by radiation, the wavelength of the luminescence is usually longer than that of the incident radiation. This is the case when visible luminescence is excited by ultra-violet, X-rays, or gamma rays.

Expressed symbolically, if radiation from a source has a wave length $\lambda_0$ and is incident upon luminescent material, the incident radiation is absorbed and a luminescent radiation emitted which has a different wavelength $\lambda_e$. Now, if the detection means is responsive to radiation of wavelengths in the range $\lambda_1$ to $\lambda_2$, then by proper selection of the luminescent material, its emission $\lambda_e$ is outside the range of sensitivity of the detector. A filter which transmits $\lambda_0$ but not $\lambda_e$ may be employed to limit detector sensitivity.

Reverting now to the non-luminescent materials, these are exemplified by UV (ultraviolet) absorbers such as American Cyanamid Company's "Cyasorb UV 24" which absorbs wavelengths below 380 millimicrons. In this case, there is very little visible luminescence; the incident radiation is converted primarily to radiation in the infra-red region of the electromagnetic spectrum.

Referring to FIGURE 1, it will be seen that radiation from source 10 having wavelength $\lambda_0$ passes into optical system 12, represented by a box having aligned windows 12a and 12b in opposite walls and having its interior surface finished with frequency converter material, luminescent or non-luminescent. The principal beam passes through windows 12a, 12b and on to detector 14. Scattered rays striking the inner surface of the box 12 are absorbed and stimulate emission of radiation $\lambda_e$ to which detector 14 is insensitive. Consequently, even though the beam emerging from the optical system is composed of wavelength regions $\lambda_0$ and $\lambda_e$, the detector responds only to $\lambda_0$.

One practical application of the principle will now be described as applied to an optical pinhole-detection apparatus 20, a representative fragment of which is shown in FIGURE 2.

The basic construction of apparatus 20 is conventional and, therefore, has been shown more or less schematically. It consists of a housing made up of an upper section 22 and a lower section 24 disposed and supported in spaced relation by structure, not shown, to permit indeterminate lengths of sheet material 26 to traverse therebetween. One of the foremost uses of equipment of this type is for the inspection of thin "tin plate" sheet steel for pinholes. The tin plate usually processed is for use in fabrication of "tin cans" and may be from 2 to 20 mils in thickness. Pinholes not larger, and preferably smaller, than one mil in diameter must be detected.

Housing sections 22 and 24 are elongated in a direction transverse to the direction of movement of tin plate 26 (which is perpendicular to the plane of the paper in FIGURE 2) and are substantially the same at each end. Upper section 22 of inverted-trough-shaped configuration contains a source of ultraviolet light which, in the illustrated embodiment, is a fluorescent tube 28. Lower housing section 24, also trough-shaped but disposed in an upright attitude, contains a bank of photomultiplier tubes 30a, 30b, 30c . . . arranged in a single row at uniformly spaced intervals. Pairs of reflectors 32, diverging upwardly from each photomultiplier tube, funnel light to the respective tubes.

Overlying the bank of tubes and reflectors, and closing the top of lower housing section 24, is a plate 34 of Pyrex glass superposed on a plate 36 of filter glass or the like adapted to transmit only the particular UV wavelength emitted by tube 28, e.g., about 3600 A. From the structure thus far described it will be seen that, as sheet material 26 is drawn through the apparatus, UV light from source 28 will pass through any pinholes in the material and, impinging on the underlying photomultiplier tube, will produce an output signal via conventional circuitry, not shown.

In order to accommodate tin plate stock of different nominal width and to compensate for width variations which are characteristic of rolled strip, a shutter assembly 38 is provided to prevent UV from source 28 passing around the edge of tin plate 26 and causing spurious signals from the detector tubes.

Due to the irregular edge of the tin plate, and to avoid wear and prevent ruffling the edges of thin stock, shutter assemblies are necessarily designed to operate without making physical contact with the edges of sheet 26. To this end, the shutter proper, 40, takes the form of an assemblage of baffle plates which is U-shaped when viewed in section along a plane perpendicular to tin plate 26, the edge of which passes between the legs of the U. Specifically, shutter 40 consists of an upper baffle plate 42 and a lower baffle plate 44 separated by a suitable spacer, such as block 46, between the outer edges of the plates.

Shutter 40 is mounted with its lower plate on a carriage member 48 which, in turn, is mounted for translational movement along a guide or track, not shown, on housing section 24. Shutter assembly 38 also includes a removable cover member 50, which defines a light-trap chamber 52 enclosing the outer end of shutter 40, i.e., the bight portion of the U-shape section.

To and fro movement of shutter assembly 38 along its track is effected by a reversible electric motor 52 mechanically coupled to the shutter assembly by any suitable linkage, schematically represented by broken line 54. Motor 52 is under the control of a servo system diagrammatically represented by block 56 which receives feedback signals as to the position of shutter assembly 38 from a photocell 58 disposed in a recess 60 in lower baffle plate 44 of shutter 40. Photocell 58 is electrically connected to the servo circuitry 56 by means of slack, flexible conductors 62.

Substantially aligned with recess 60 in lower baffle plate 44 is an aperture 64 in upper baffle plate 42. UV light from source 28 passes through aperture 64 and normally impinges on photocell 58. However, as will be seen from FIGURE 2, light incident upon photocell 58 can be wholly or partially intercepted by the intrusion of the edge of sheet material 26 between baffles 42 and 44 to the point where it is wholly or partially interposed between aperture 64 and photocell 58. In order to maintain a constant, predetermined width of overlap of the edge of sheet 26 by baffle plates 42, 44, established by the position of photocell 58, the servo-control circuitry is adjusted to energize motor 52 so as to move shutter assembly inwardly (toward the sheet material) or outwardly, as necessary to maintain a constant illumination of the photocell. Thus, as the edge of sheet 26 intrudes farther than the preset amount between baffles 42, 44, due to local increase in width or shifting of the sheet, the shutter assembly is withdrawn a comparable amount to compensate. A duplicate but independent shutter assembly and control system, not shown, is provided on the other side of the apparatus to monitor the opposite edge of the sheet material undergoing inspection.

From the described structure and operation of the pinhole detector, it will be seen that reflections of UV light from the underside of baffle plate 42 and upper surface of baffle plate 44 would affect the response of photocell 58 causing erroneous positioning of shutter assembly 38. It is, of course, undesirable to increase the overlap between the edge of sheet 26 and baffle plates 42, 44 in order to provide more margin for error because the width of the overlap represents uninspected material. On the other hand, if the shutter assembly does not closely follow the edge of sheet 26, direct or reflected light from source 28 can impinge on one of the photomultipliers, say 30a or 30b, causing a spurious indication of non-existent pinholes.

In accordance with the present invention as applied to apparatus of this kind, reflections of UV light are prevented by providing frequency-converting materials on the reflecting surfaces, as previously explained. To this end, baffle 42 is shown as a laminated structure comprising a structural layer 42a and a layer 42b of luminescent or non-luminescent frequency converting material which emits visible or invisible radiant energy of wavelengths outside the range of sensitivity of photocell 58. The UV filter 36, in effect, renders photomultiplier tubes 30a, 30b . . . insensitive to the wavelengths "reflected" by the frequency converting material. Lower baffle plate 44 is likewise constructed entirely, or provided with an upper surface, of the frequency converting material.

In one practical form of the invention baffle plates 42, 44 are constructed of, or laminated with, a methacrylate plastic such as Lucite (methyl methacrylate) which has embedded therein 8% by volume of "Cyasorb® UV 24," American Cyanamid Company trademark which is the chemical 2,2'-dihydroxy-4-methoxybenzophenone.

While there has been described what at present is believed to be the preferred embodiment of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. Apparatus for detection of minute perforations in sheet material, comprising:
   a source of radiation in a predetermined range of wavelengths and not transmissable by the sheet material to be inspected;
   radiation detection means disposed with respect to said source so as to receive radiation therefrom and to define a space, traversed by said radiation, for the reception of sheet material to be inspected, such material extending in a plane transverse to the path of said radiation; and
   baffle means in said space adapted to co-act with the edges of sheet material therein to preclude passage around said edges of radiation from said source to said detection means, at least the surface portions of said baffle means on which radiation is incident being formed of a frequency converting luminescent material which converts such radiation to radiant energy in a second band of wavelengths beyond the range of response of said detection means.

2. Apparatus according to claim 1 including filter means disposed to intercept all radiation passing to said detection means, said filter means transmitting no radiation in said second band of wavelengths.

3. Apparatus according to claim 2 wherein said filter means transmits only radiation in said predetermined range of wavelengths.

4. Apparatus according to claim 1 wherein said baffle means are adjustably moveable toward and away from each other and including additional radiation detection means on said baffle means, positioned on the side opposite from said radiation source, with respect to the plane of the sheet material undergoing inspection; and
   servo system means responsive to radiation from said source incident upon said additional radiation detection means, drivingly connected to said baffle means and aperture to maintain a substantially constant spatial relation between said baffle means and the edges of such sheet material.

References Cited
UNITED STATES PATENTS

| | | | |
|---|---|---|---|
| 3,325,648 | 6/1967 | Moskowitz | 250—237 |
| 3,335,282 | 8/1967 | Masson | 250—237 |
| 3,255,356 | 6/1966 | Brosious et al. | 250—219 |
| 3,263,086 | 7/1966 | Brosious et al. | 250—237 X |

RALPH G. NILSON, *Primary Examiner.*

T. N. GRIGSBY, *Assistant Examiner.*